(12) United States Patent
McIntyre et al.

(10) Patent No.: US 12,117,087 B2
(45) Date of Patent: Oct. 15, 2024

(54) BREATHER VALVE

(71) Applicant: Peach Teats Limited, Marton (NZ)

(72) Inventors: Robert Dymock McIntyre, Marton (NZ); Rex Alan Pike, Marton (NZ)

(73) Assignee: Peach Teats Limited, Marton (NZ)

( * ) Notice: Subject to any disclaimer, the term of this patent is extended or adjusted under 35 U.S.C. 154(b) by 0 days.

(21) Appl. No.: 18/566,772

(22) PCT Filed: May 10, 2022

(86) PCT No.: PCT/NZ2022/050053
§ 371 (c)(1),
(2) Date: Dec. 4, 2023

(87) PCT Pub. No.: WO2022/255884
PCT Pub. Date: Dec. 8, 2022

(65) Prior Publication Data
US 2024/0263714 A1    Aug. 8, 2024

(30) Foreign Application Priority Data

Jun. 3, 2021 (NZ) ........................................ 776867

(51) Int. Cl.
*F16K 24/06* (2006.01)
*A01K 9/00* (2006.01)

(52) U.S. Cl.
CPC ................ *F16K 24/06* (2013.01); *A01K 9/00* (2013.01); *F16K 2200/50* (2021.08)

(58) Field of Classification Search
CPC ........ F16K 24/06; F16K 2200/50; A01K 9/00
See application file for complete search history.

(56) References Cited

U.S. PATENT DOCUMENTS

2015/0108151 A1    4/2015  Williams
2015/0327511 A1*  11/2015  Pike .................. A01K 9/00
                                                        119/51.01

FOREIGN PATENT DOCUMENTS

| AU | 2003204064 B8 | 6/2003 |
| ES | 263886 U | 11/1982 |
| FR | 652524 A | 3/1929 |
| WO | 1998031323 A1 | 7/1998 |

OTHER PUBLICATIONS

International Search Report and Written Opinion issued in PCT/NZ2022/050053 on Aug. 22, 20222 (7 pages).

* cited by examiner

*Primary Examiner* — P. Macade Nichols
(74) *Attorney, Agent, or Firm* — ARC IP Law, PC; Joseph J. Mayo (57) ABSTRACT

The invention includes a breather valve used on containers that selectively allows a flow of air through the breather valve and which may be used to regulate the flow rate of fluid from a container or nursing bottle that includes the breather valve. The invention also includes containers and nursing bottles that include the breather valve along with methods of use of the breather valve, the containers and the nursing bottles. The breather valve, the containers, the nursing bottles and the methods of use allow for the ability to adjust flow rate rapidly, provision of a breather valve that may be retrofitted or sold with a new container or nursing bottle. The breather valve is designed in a manner that is semi-permanent to fit.

20 Claims, 6 Drawing Sheets

SECTION A-A

SECTION B-B

BREATHER VALVE

TECHNICAL FIELD

Described herein is a breather valve. More specifically, a breather valve with a two piece design, a container and nursing bottle with the breather valve and a method of use thereof.

BACKGROUND ART

Containers are widely used for storage of fluids and for pouring fluids from the containers in many applications. Inherent to such containers may be a need to allow for an air flow to the container otherwise fluid flow may be delayed or pulsed or otherwise not steady as a vacuum builds in the container cavity while fluid exits the container opening. In some containers, this need for transfer of air may not be an issue, for example, when the opening of the container is relatively large so as to allow co-current transfer of fluid and air. Where the opening is small and largely taken up by fluid flow, air cannot enter in a smooth manner via the opening. Transfer of air may also not be an issue when the volume of fluid that exists the container outlet is relatively small (hence the amount of vacuum produced may also be small).

In the context of containers where significant fluid flow needs to occur and where the outlet is smaller, flow of fluid may be reduced or even halted as the fluid level drops in the container. In applications such as nursing bottles for animals which have a larger volume and narrow outlet (a teat), the vacuum resulting as fluid exits the nursing bottle may result in fluid (e.g. milk) flow slowing significantly, milk flow stopping, or milk flow becoming difficult to achieve through sucking action by the animal. Ideally, in these situations, it may be useful to provide a breather valve on the container to allow air entry into the container cavity and prevent a vacuum building.

Breather valves do exist however they may have drawbacks. Multi-part valves where the breather valve comprises a base and tap have had mixed success commercially. While they address the problem of a vacuum, the tap portion may easily clog or hold dirt during use leading to inability to fully close or open the valve. A further drawback of existing two part designs is that the tap (or base even) may detach from the base or container and the parts be lost or fall from the container. Since these parts are often small, once lost from the container, they may be difficult to find and replace. A further drawback of existing breather valve designs is that, to install them, access is need inside the container, for example to hold a nut or washer that the breather valve shaft or bolt threads onto to retain the breather valve to the container. Access to container may be difficult for example due to a narrowed neck of the container e.g. a nursing bottle. The container design may in fact prevent internal access altogether. Another problem with art breather valves is that flow rate regulation may be compromised. For example, the flow rate may change dramatically as the tap is opened in a binary nature form fully open to fully closed and with little adjustment between each extreme. The other extreme may occur often as well where flow rate only changes very slowly as the valve is opened leading to user frustration.

Further aspects and advantages of the breather valve, a container and nursing bottle with the breather valve and a method of use thereof will become apparent from the ensuing description that is given by way of example only.

SUMMARY

Described herein is a breather valve configured for use on containers that selectively allows a flow of air through the valve and which may be used to regulate the flow rate of fluid from a container comprising the breather valve. Further described are containers and nursing bottles comprising the breather valve along with methods of use of the breather valve and container.

In a first aspect, there is provided a breather valve configured to allow air flow into a container, the valve comprising:
  a base portion, and
  a tap portion,
  wherein:
    the base portion comprises a head, base and shaft section with an exterior shape configured to fit with interference into a hole in the container to which it is fitted and wherein the shaft section and head have an axial threaded cavity therein;
    the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
    wherein, when the tap portion is unthreaded from the base portion, the at least one recess on the tap portion elongated shaft is exposed allowing air to pass through the recess and into the container; and
    when the tap portion is wound out, the thread on the elongated shaft terminates and the at least one foot of the tap engages a part of the base of the base portion and acts to retain the tap portion to the base portion preventing further opening of the tap relative to the base portion.

In a second aspect, there is provided a container comprising:
  an opening for fluid to flow from the container; and
  a breather valve, the breather valve comprising:
    a base portion, and
    a tap portion,
    wherein:
    the base portion comprises a head, base and shaft section with an exterior shape configured to fit with interference into a hole in the container to which it is fitted and wherein the shaft section and head have an axial threaded cavity therein;
    the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
    wherein, when the tap portion is unthreaded from the base portion, the at least one recess on the tap portion elongated shaft is exposed allowing air to pass through the recess and into the container; and
    when the tap portion is wound out, the thread on the elongated shaft terminates and the at least one foot of the tap engages a part of the base of the base portion and acts to retain the tap portion to the base portion preventing further opening of the tap relative to the base portion.

In a third aspect, there is provided a nursing bottle configured for feeding a calf, the nursing bottle comprising:

a teat configured for a calf to suck on to obtain fluid from the nursing bottle; and a breather valve, the breather valve comprising:
  a base portion; and
  a tap portion;
wherein:
  the base portion comprises a head, base and shaft section with an exterior shape configured to fit with interference into a hole in the nursing bottle to which it is fitted and wherein the shaft section and head have an axial threaded cavity therein;
  the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
  wherein, when the tap portion is unthreaded from the base portion, the at least one recess on the tap portion elongated shaft is exposed allowing air to pass through the recess and into the nursing bottle; and
  when the tap portion is wound out, the thread on the elongated shaft terminates and the at least one foot of the tap engages a part of the base of the base portion and acts to retain the tap portion to the base portion preventing further opening of the tap relative to the base portion.

In a fourth aspect, there is provided a method of feeding a calf comprising:
  selecting a nursing bottle for feeding calves, the nursing bottle comprising a teat that the calf sucks on to obtain fluid from the nursing bottle;
  the nursing bottle further comprising a breather valve substantially as described above; and
  allowing the calf to drink from the teat and adjusting the breather valve to adjust a flow rate of fluid from the nursing bottle.

Selected advantages of the above described breather valve, container, nursing bottle and methods of use include the ability to adjust flow rate rapidly, provision of a valve that may be retrofitted or sold with a new container; and a design of breather valve that is semi-permanent to fit and where the breather valve tap is very difficult to remove from the valve base or container during normal use. More advantages will become apparent from the description below.

BRIEF DESCRIPTION OF THE DRAWINGS

Further aspects of the breather valve, a container and nursing bottle with the breather valve and a method of use thereof will become apparent from the following description that is given by way of example only and with reference to the accompanying drawings in which:

FIG. 7 illustrates FIGS. 7A, 7B and 7C respectively illustrate plan, front cross-section and side elevations for the tap portion of the breather valve; and FIG. 8 illustrates-FIGS. 8A, 8B and 8C respectively illustrate plan, front cross-section and side elevations for the base portion of the breather valve.

DETAILED DESCRIPTION

As noted above, described herein is a breather valve configured for use on containers that selectively allows a flow of air through the valve and which may be used to regulate the flow rate of fluid from a container comprising the breather valve. Further described are containers and nursing bottles comprising the breather valve along with methods of use of the breather valve and container.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

Breather Valve

In a first aspect, there is provided a breather valve configured to allow air flow into a container, the valve comprising:
  a base portion, and
  a tap portion,
wherein:
  the base portion comprises a head, base and shaft section with an exterior shape configured to fit with interference into a hole in the container to which it is fitted and wherein the shaft section and head have an axial threaded cavity therein;
  the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
  wherein, when the tap portion is unthreaded from the base portion, the at least one recess on the tap portion elongated shaft is exposed allowing air to pass through the recess and into the container; and
  when the tap portion is wound out, the thread on the elongated shaft terminates and the at least one foot of the tap engages a part of the base of the base portion and acts to retain the tap portion to the base portion preventing further opening of the tap relative to the base portion.

Container Type

The container may be a nursing bottle. The container may be a nursing bottle for feeding calves and may comprise a teat that the calf sucks on to obtain fluid from the container The fluid may be milk or a milk alternative solution such as a milk formula solution.

Base Portion

The base portion may fit into and retains the breather valve to the container. The base portion may be configured to fit and self-tap into the recess in the container. The container hole may have a diameter corresponding to the base of the base portion. The base portion may have a conical exterior, the conical exterior configured to interfere with sides of the container recess and elastically, plastically or elastically and plastically deforming the sides of the recess during fitting.

At least part of the exterior of the base portion may be threaded. The pitch of this thread may be selected to draw in and hold the base portion to the container hole and to help self-tap the base portion into the hole.

The base portion may comprise a head. The base portion head may have a slightly wider diameter than the base portion shaft widest point. The base portion head or a side thereof may be configured to abut the container to which it is fitted.

The internal thread of the base portion may extend along the length of the base portion internal opening. The pitch of the internal thread may correspond to the pitch of the tap shaft.

The base of the base portion may have a generally planar form and the at least one foot of the tap portion may engage or abut against this planar form.

Tap Portion

The tap portion head may have a wider diameter than the shaft of the tap portion.

The tap portion head diameter may have a similar diameter to the base portion head.

The tap portion head may comprise features to enable easy turning of the tap to open and close the breather valve.

The tap portion thread may extend from beneath the tap portion shoulder to a point part way along the tap portion shaft.

A length of the tap portion thread may coincide with a maximum unthreaded length of tap portion relative to base portion prior to the at least one foot engaging the base of the base portion.

A section of the tap portion shaft may have no thread.

Air Flow Recess

The shaft may comprise multiple recesses. The recesses are used to provide air transfer through the valve during pouring of fluid from the container and ensure a smooth flow of fluid form the container during pouring or movement of fluid from a container outlet.

In one embodiment a recess may be shaped as a channel or notch in the shaft. The channel or notch may be located axially along the shaft longitudinal axis. The recess may terminate at one end about the tap portion head and terminate at the opposing end at a point approximately 10-50% along the shaft axis from the head.

Foot Portion

The at least one foot of the tap portion may have an extension extending at least partially radially from the shaft.

The extension may extend in an orthogonal direction to the shaft longitudinal axis.

One side of the foot may engage or abut the base of the base portion when the tap portion is fully open.

The at least one foot may move forward into the container beyond the base of the base portion when the tap is closed.

The base of the base portion may have a generally planar form that the foot of the tap portion engages or abuts.

The at least one foot may be resilient and may move relative to the shaft longitudinal axis. Resilient movement may be rotationally relative to a pivot point located on a part of the shaft. The pivot point of the at least one foot may be eccentric to the shaft longitudinal axis.

In one embodiment, the tap portion may have two feet.

Bevelled Seal

Intermediate the at least one foot and shaft thread on the tap portion, may be a bevelled face. The bevelled face on the tap portion may be located so as to abut a corresponding bevelled face on the base portion. The bevelled face on the base portion may be located on or about the base of the base portion inside the base portion opening. The bevelled faces on the tap portion and base portion may be configured to prevent air flow through the valve when the bevelled faces abut one another. Airflow may occur about the bevelled faces when the faces separate such as when the tap portion is fully closed or threaded in relative to the base portion.

Bevelling may be on a 30 to 60 degree angle.

The bevel on the tap portion may comprise:
a shoulder extending radially from the tap portion shaft; or
a step down in shaft diameter at the bevelled face.

More specifically, bevelling may be achieved on the tap portion by using a shoulder extending radially from the tap portion shaft or may be achieved by having a step down in shaft diameter at the bevelled face.

The bevel on the base portion may comprise:
a shoulder extending radially from the base of an interior of the base portion; or
a step or decrease in internal diameter.

More specifically, bevelling may be achieved on the base portion by using a shoulder extending radially from the base of the base portion interior or may be achieved by having a step or decrease in internal diameter.

The recess described above to allow air flow through the valve may terminate prior to the bevelled face.

Container

In a second aspect, there is provided a container comprising:
an opening for fluid to flow from the container; and
a breather valve, the breather valve comprising:
a base portion, and
a tap portion,
wherein:
the base portion comprises a head, base and shaft section with an exterior shape configured to fit with interference into a hole in the container to which it is fitted and wherein the shaft section and head have an axial threaded cavity therein;
the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
wherein, when the tap portion is unthreaded from the base portion, the at least one recess on the tap portion elongated shaft is exposed allowing air to pass through the recess and into the container; and when the tap portion is wound out, the thread on the elongated shaft terminates and the at least one foot of the tap engages a part of the base of the base portion and acts to retain the tap portion to the base portion preventing further opening of the tap relative to the base portion.

Breather Valve Location and Fit

The breather valve may be located on the container above the fluid level when the container is emptied or drained. In one embodiment, the breather valve may be located at a point opposite to the main outlet of the container. For example, the breather valve may be located at the base of the container distant to the top opening so that the breather valve is always above a fluid line inside the container.

The base portion of the breather valve may further fit into and retain the breather valve to the container.

Nursing Bottle

In a third aspect, there is provided a nursing bottle configured for feeding a calf, the nursing bottle comprising:
 a teat configured for a calf to suck on to obtain fluid from the nursing bottle; and
 a breather valve, the breather valve comprising:
  a base portion; and
  a tap portion;
 wherein:
  the base portion comprises a head, base and shaft section with an exterior shape configured to fit with interference into a hole in the nursing bottle to which it is fitted and wherein the shaft section and head have an axial threaded cavity therein;
  the tap portion comprises: a head, an elongated shaft extending from the head, a thread on the elongated shaft that cooperates with the axial threaded cavity on the base portion, a non-threaded portion of the shaft, at least one recess on the shaft configured to allow air flow therethrough, and at least one foot on the shaft distal to the head, the at least one foot configured to engage a part of the base of the base portion;
  wherein, when the tap portion is unthreaded from the base portion, the at least one recess on the tap portion elongated shaft is exposed allowing air to pass through the recess and into the nursing bottle; and
  when the tap portion is wound out, the thread on the elongated shaft terminates and the at least one foot of the tap engages a part of the base of the base portion and acts to retain the tap portion to the base portion preventing further opening of the tap relative to the base portion.

Breather Valve Location and Fit

The breather valve may be located on the nursing bottle above the fluid level when the nursing bottle is used to feed a calf. In one embodiment, the breather valve may be located at a point opposite to the main outlet of the nursing bottle. For example, the breather valve may be located at the base of a nursing bottle distant to the teat so that, when used to feed a calf, the breather valve is always above the fluid line inside the nursing bottle.

The base portion of the breather valve may further fit into and retain the breather valve to the nursing bottle.

Method

In a fourth aspect, there is provided a method of feeding a calf comprising:
 selecting a nursing bottle for feeding calves, the nursing bottle comprising a teat that the calf sucks on to obtain fluid from the nursing bottle;
 the nursing bottle further comprising a breather valve substantially as described above; and
 allowing the calf to drink from the teat and adjusting the breather valve to adjust a flow rate of fluid from the nursing bottle.

The above described breather valve, container, nursing bottle and method of use may provide a number of advantages over the prior art including but not limited to.

Providing a valve means that allows simple flow adjustment;

The valve can be retrofitted or supplied with a container at purchase hence is versatile in nature and use;

The valve as a whole is difficult to remove without significant effort/tools and hence is unlikely to be lost or detach while in use;

The valve tap cannot be removed from the valve base hence, is cannot be lost or detached while in use;

The nature of the breather valve design means that dirt tends to be pushed away from the valve seat if present and hence the breather valve rarely if ever clogs valve closure or opening in the inventor's experience;

No internal reach inside a container to which the breather valve is fitted is needed to fit the valve to a container. There are no internal nuts, bolts or washers associated with fixing the breather valve to a container;

The flow rate can be adjusted within a range from slow to fast flow;

The flow rate can be adjusted quickly with only a small number of revolutions needed of the breather valve tap to go from full closure to full opening.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described breather valve, a container and nursing bottle with the breather valve and a method of use thereof are now described by reference to specific examples.

EXAMPLE 1—FIG. 3-8 not Referred to Below

In this example, a nursing bottle 1 is described that comprises an embodiment of breather valve 2. Reference to a nursing bottle 1 should not be seen as limiting since the bottle 1 may be almost any container and the breather valve 2 used in applications beyond just a nursing bottle 1.

Figure 1:
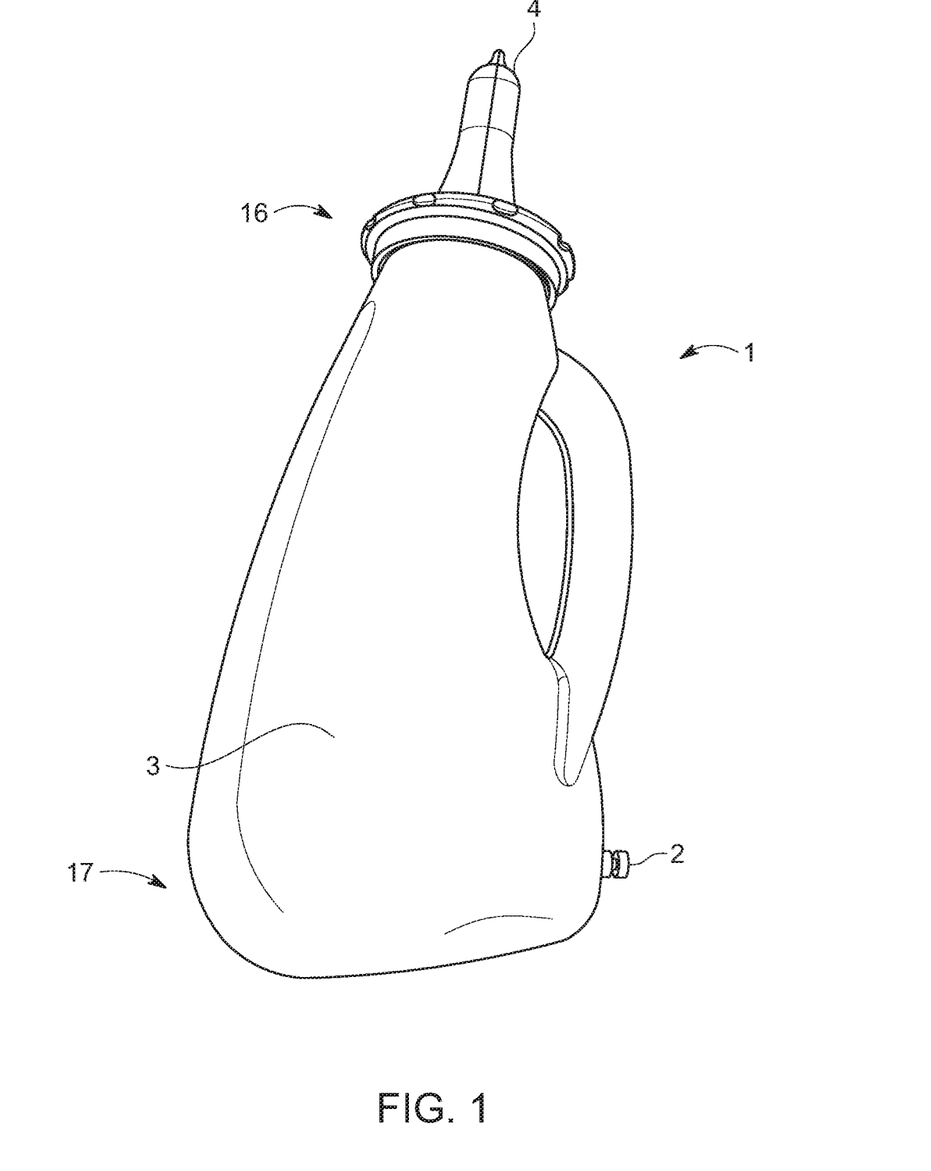
FIG. 1 illustrates a front view of a photograph of an example nursing bottle with one embodiment of breather valve attached to the bottle.
Figure 2:
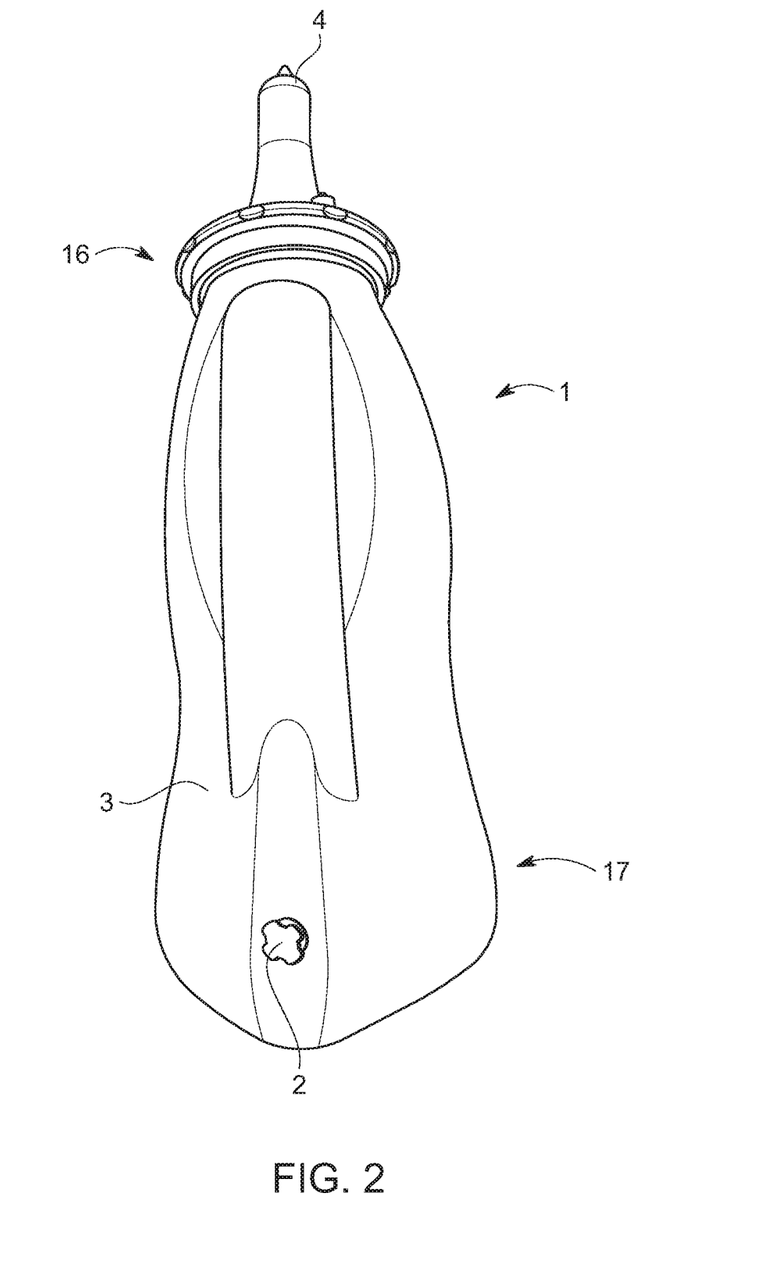
FIG. 2 illustrates a side view of a photograph of an example nursing bottle with one embodiment of breather valve attached to the bottle.
Figure 3:
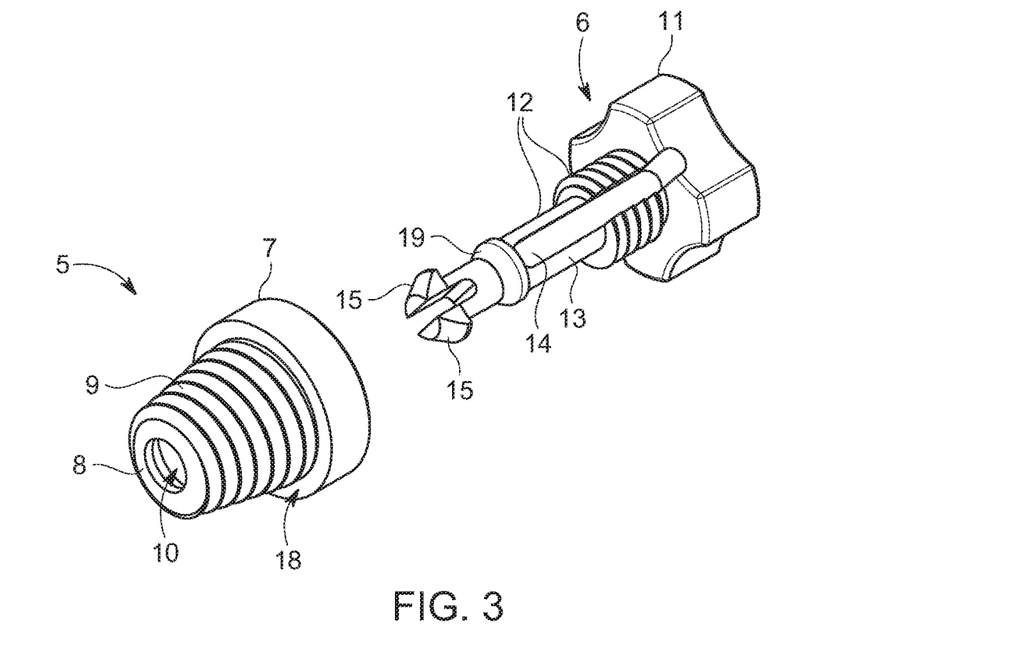
FIG. 3 illustrates a perspective view of the breather valve tap portion and base portion separated.
Figure 4:
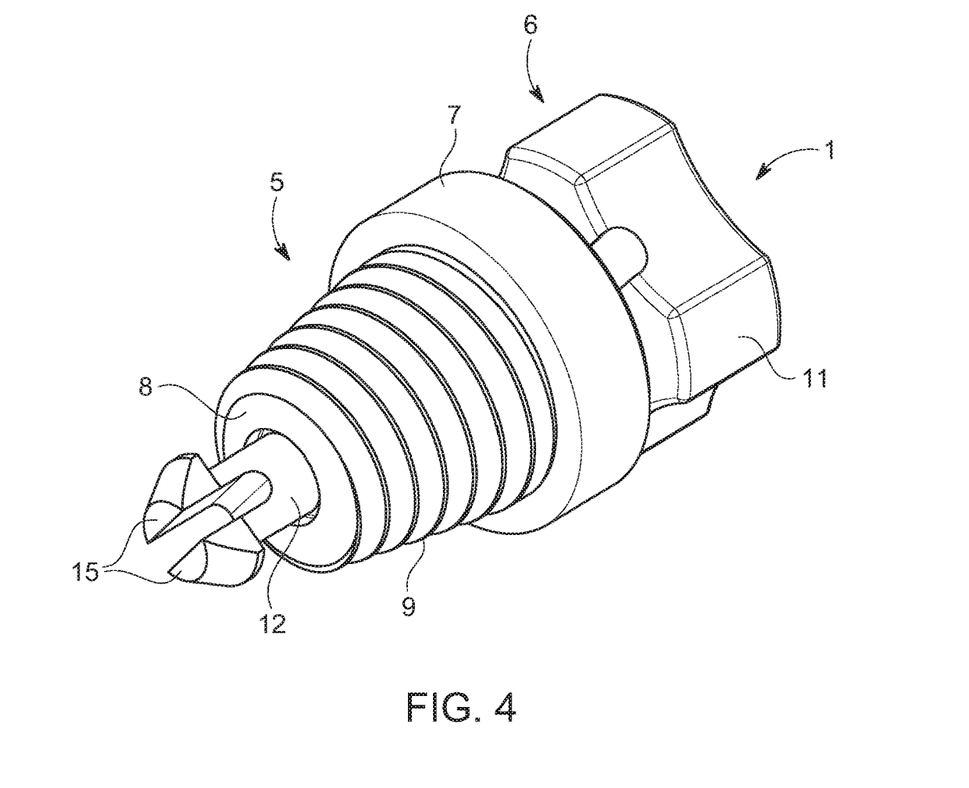
FIG. 4 illustrates a perspective view of the breather valve tap portion and base portion combined.
Figure 5:
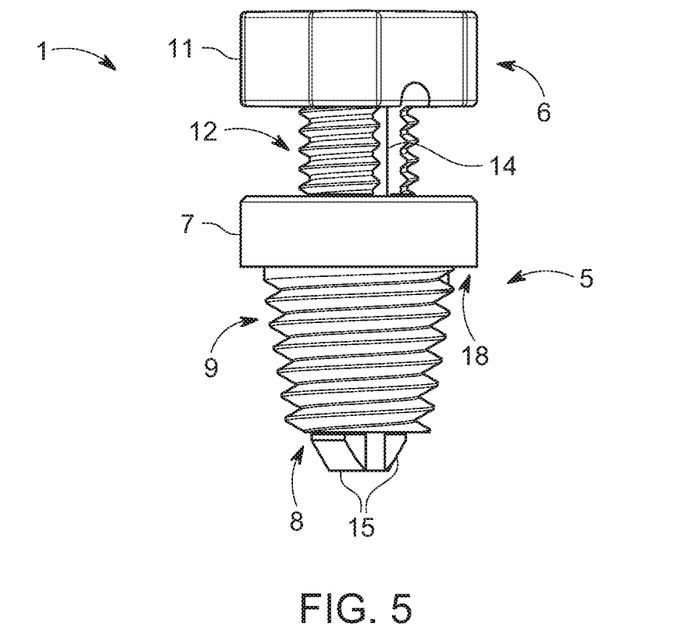
FIG. 5 illustrates a side view of the breather valve with the tap portion opened to its maximum position relative to the base portion.
Figure 6:
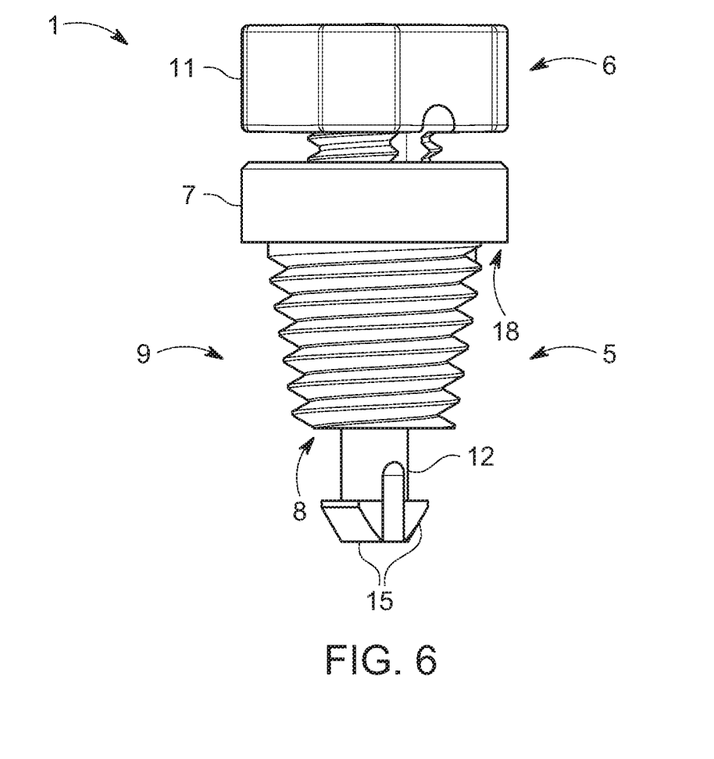
FIG. 6 illustrates a side view of the breather valve with the tap portion closed to its minimum position relative to the base portion.
Figure 7A:
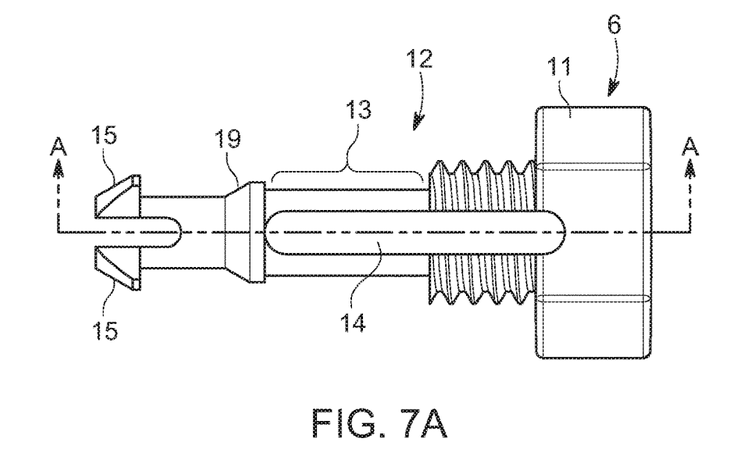
Figure 7B:
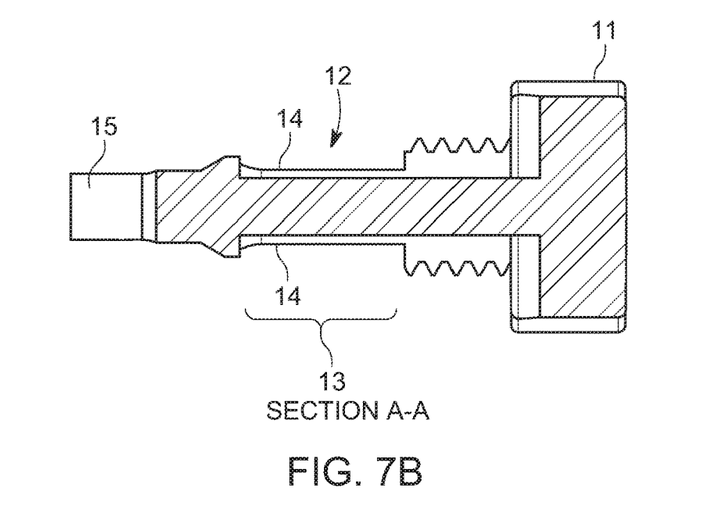
Figure 7C:
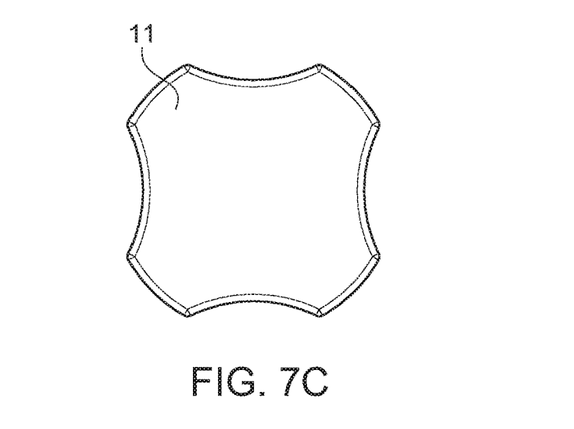
Figure 8A:
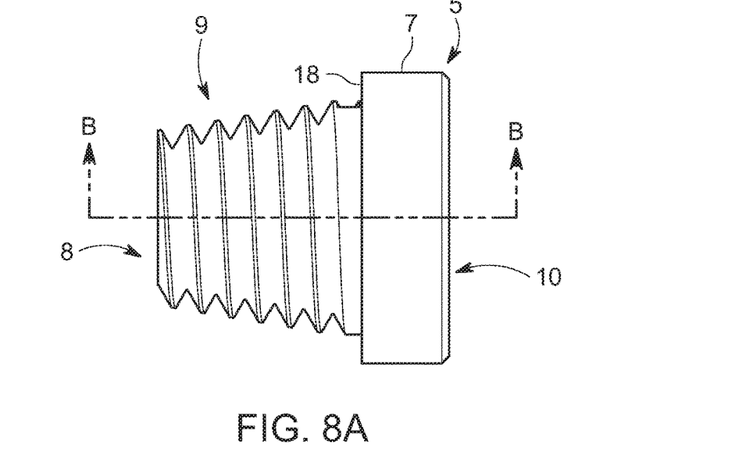
Figure 8B:
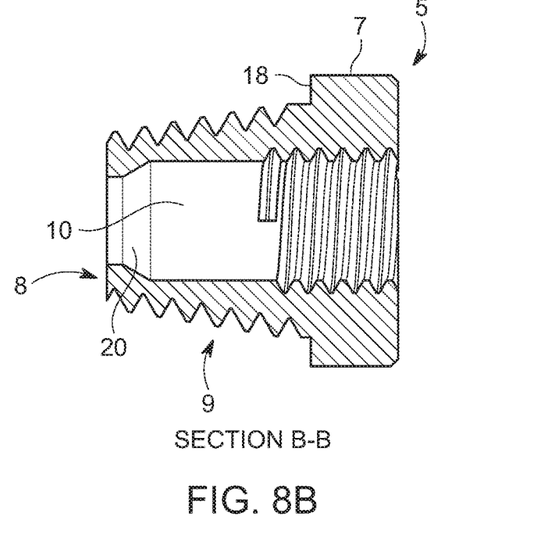
Figure 8C:
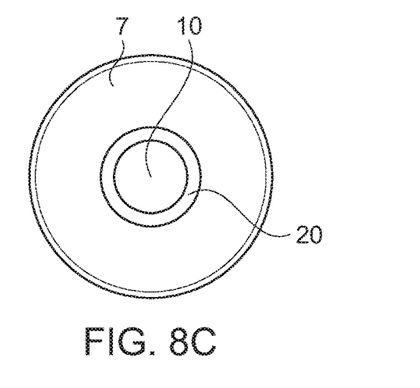

FIG. 1 and FIG. 2 show an example nursing bottle 1 comprising a breather valve 2. The nursing bottle 1 comprises a cavity 3 in which milk or milk formula is placed (not shown) and mixed and a top 16 through which milk exits, the top 16 having an opening on which is located a teat 4. The teat 4 shown is one designed for use by nursing calves however other size teats may be used. At the base 17 of the nursing bottle 1 is located a breather valve 2.

The breather valve 2 shown is configured to allow air flow into the nursing bottle 1 cavity 3 through the valve 2. The breather valve 2 comprises a base portion 5, and a tap portion 6.

The base portion 5 comprises a head 7, base 8 and shaft 9 with an exterior shape configured to fit with interference into a hole (not shown) in the nursing bottle 1 to which it is fitted. The shaft 9 and head 7 have an axial threaded cavity 10 therein.

The tap portion 6 comprises a head 11, an elongated shaft 12 extending from the head 11, a thread on the elongated shaft 12 that cooperates with the axial threaded cavity 10 on the base portion 5, a non-threaded portion 13 of the shaft 12, at least one recess 14 on the shaft 12 configured to allow air flow therethrough, and at least one foot 15 on the shaft 12 distal to the head 11, the foot/feet 15 configured to engage a part of the base 8 of the base portion 5.

When the tap portion 6 is unthreaded from the base portion 5, one or more recesses 14 on the tap portion 6 elongated shaft 12 are exposed allowing air to pass through the recess 14 and into the bottle 1.

When the tap portion 6 is wound out to a maximum point, the thread on the elongated shaft 12 terminates and the foot/feet 15 of the tap portion 6 engage a part of the base 8 of the base portion 5. The foot (or feet) 15 act to retain the tap portion 6 to the base portion 5 preventing further opening of the tap portion 6 relative to the base portion 5.

The breather valve 2 is located on the bottle 1 base 17 so that the breather valve 2 is above a fluid level when the bottle 1 is emptied or used to feed a calf (not shown)—that is the bottle 1 is tipped over towards the bottle 1 top 16 in this example which leaves an air cavity in the bottle 1 base 17 that the breather valve 2 communicates air to if the breather valve 2 is open.

The base portion 5 of the breather valve 2 fits into a hole (not shown) in the bottle 1 and acts to retain the breather valve 2 to the bottle 1. The bottle 1 hole has a diameter corresponding to the base 8 of the base portion 5 and, the base portion 5 self-taps into the hole, the conical sides of the base portion 5 shaft 9 exterior interfering with the bottle 1 hole sides during fitting which then acts to hold the base portion 5 in place.

The exterior of the base portion 5 shaft 9 is threaded and the pitch of this thread is designed to draw in and hold the base portion 5 to the bottle 1 hole and to help self-tap the base portion 5 into the hole. The base portion 5 has a head 7 has a slightly wider diameter than the base portion 5 shaft 9 widest point. The head 7 on one underside 18 abuts the bottle 1 once fitted to the bottle 1.

The base 8 of the base portion 5 has a generally planar form and foot/feet 15 of the tap portion 6 engage or abut against this planar form.

The tap portion 6 head 11 has a slightly wider diameter than the shaft 12 of the tap portion 6 and this diameter is the same diameter to the base portion 5 head 7. The tap portion 6 head 11 is shaped to enable easy turning of the tap portion 6 to open and close the breather valve 2. The tap portion 6 shaft 12 thread extends from beneath the tap portion 6 head 11 to a point part way along the tap portion 6 shaft 12. The length of the tap portion 6 thread in this embodiment is set by a maximum unthreaded length of tap portion 6 relative to base portion 5 prior to the at least one foot/feet 15 engaging the base 8 of the base portion 5.

As shown in the drawings, part of the tap portion 6 shaft 12 has no thread 13 so that the tap portion 6 simply spins relative to the base portion 5 when this unthreaded region 13 is reached.

Multiple tap portion 6 shaft recesses 14 are shown in the Figures as two opposing elongated channels 14 on the tap portion 6 shaft 12 that allow air transfer through the breather valve 2.

Each foot/feet 15 of the tap portion 6 extends orthogonally and radially from the tap shaft 12. A foot 15 abuts the base portion 5 base when the tap portion 6 is fully undone and the foot/feet 15 move forward into the bottle 1 beyond the base 8 of the base portion 5 when the tap portion 6 is closed.

Each foot 15 may have some resilience to move relative to the tap shaft 12 longitudinal axis so that, when the tap portion 6 is fitted to the base portion 5, the foot/feet 15 bend in towards the tap shaft 12 longitudinal axis slightly during insertion and snap outwards relative to the tap shaft 12 axis when they push out beyond the base 8 of the base portion 5, preventing subsequent removal of the tap portion 6 from the base portion 5.

As shown in the drawings, the tap portion 6 may have two feet 15 however, more or fewer feet 15 may be used as desired.

Intermediate the foot/feet 15 and tap shaft 12 thread on the tap portion 6 is a bevelled face 19 that, when the tap portion 6 is closed relative to the base portion 5, the tap portion 6 bevel 19 abuts a corresponding bevelled face 20 on the base portion 5. The bevelled faces 19, 20 are configured to prevent air flow through the valve 2 when the bevelled faces 19, 20 abut one another, such as when the tap portion 6 is fully closed or threaded in relative to the base portion 5.

In use, the nursing bottle 1 may be filled with milk or milk formula, the teat 4 fitted to the nursing bottle 1 outlet and the nursing bottle 1 turned upside down to feed the animal such as a calf via the teat 4. The breather valve 2 tap portion 6 may then be adjusted by turning the valve 2 along the thread to open or close the tap portion 6 of the breather valve 2 relative to the base portion 5 so as to let in more air or less air and in doing so adjust the flow of milk or milk formula via the teat 4. Even if the tap portion 6 is completely opened, the tap portion 6 cannot fall off the base portion 5 due to the tap portion 6 foot/feet preventing removal.

Aspects of the breather valve, a container and nursing bottle with the breather valve and a method of use thereof have been described by way of example only and it should be appreciated that modifications and additions may be made thereto without departing from the scope of the claims herein.

What is claimed is:

1. A breather valve configured to allow air flow into a container, the breather valve comprising:
    a base portion, and
    a tap portion,
    wherein the base portion comprises
        a head,
        a base, and
        a shaft section with an exterior shape configured to fit with interference into a hole in the container to which it is fitted, and
        wherein the shaft section and the head have an axial threaded cavity therein;
    wherein the tap portion comprises
        a head,
        an elongated shaft extending from the head of said tap portion,
        a thread on the elongated shaft that cooperates with the axial threaded cavity on the base portion,
        a non-threaded portion of the elongated shaft,
        at least one recess on the elongated shaft configured to allow air flow therethrough, and
        at least one foot on the elongated shaft distal to the head of the tap portion,
            wherein the at least one foot is configured to engage a part of the base of the base portion;

wherein, when the tap portion is unthreaded from the base portion, the at least one recess on the elongated shaft of the tap portion is exposed allowing air to pass through the at least one recess and into the container; and wherein, when the tap portion is wound out, the thread on the elongated shaft terminates and the at least one foot of the tap portion and engages a part of the base of the base portion and acts to retain the tap portion to the base portion preventing further opening of the tap portion relative to the base portion.

2. The breather valve as claimed in claim 1 wherein the base portion is configured to fit and self-tap into the at least one recess in the container.

3. The breather valve as claimed in claim 1 wherein the base portion further comprises a conical exterior, and wherein the conical exterior is configured to interfere with sides of the at least one recess and elastically, plastically or elastically and plastically deforming the sides of the at least one recess during fitting.

4. The breather valve as claimed in claim 1 wherein the head of the base portion or a side thereof is configured to abut the container to which it is fitted.

5. The breather valve as claimed in claim 1 wherein one side of the at least one foot engages or abuts the base of the base portion when the tap portion is fully open.

6. The breather valve as claimed in claim 5 wherein the base of the base portion has a generally planar form that the at least one foot of the tap portion engages or abuts.

7. The breather valve as claimed in claim 1 wherein the head of the tap portion has a wider diameter than the elongated shaft of the tap portion.

8. The breather valve as claimed in claim 1 wherein a length of the thread of the tap portion coincides with a maximum unthreaded length of the tap portion relative to the base portion prior to the at least one foot engaging the base of the base portion.

9. The breather valve as claimed in claim 1 wherein the elongated shaft comprises multiple recesses.

10. The breather valve as claimed in claim 1 wherein the at least one foot moves forward into the container beyond the base of the base portion when the tap portion is closed.

11. The breather valve as claimed in claim 1 further comprising, intermediate the at least one foot and the thread on the tap portion, a bevelled face, and wherein the bevelled face on the tap portion is located so as to abut a corresponding bevelled face on the base portion, and wherein the bevelled face on the base portion is located on or about the base of the base portion inside an opening of the base portion and, wherein the bevelled face on the tap portion and the bevelled face on the base portion are configured to prevent air flow through the breather valve when the bevelled face on the tap portion and the bevelled face on the base portion abut one another.

12. The breather valve as claimed in claim 11 wherein the bevelled face on the tap portion comprises a shoulder extending radially from the elongated shaft of the tap portion; or a step down in shaft diameter at the bevelled face.

13. The breather valve as claimed in claim 11 wherein the bevelled face on the base portion comprises a shoulder extending radially from the base of an interior of the base portion; or a step or decrease in internal diameter.

14. A container comprising:

an opening that allows fluid to flow from the container; and a breather valve, wherein the breather valve comprises
a base portion, and
a tap portion,
wherein the base portion comprises
a head,
base, and
shaft section with an exterior shape configured to fit with interference into a hole in the container to which it is fitted, and
wherein the shaft section and head have an axial threaded cavity therein;
wherein the tap portion comprises
a head,
an elongated shaft extending from the head of the tap portion,
a thread on the elongated shaft that cooperates with the axial threaded cavity on the base portion,
a non-threaded portion of the elongated shaft,
at least one recess on the elongated shaft configured to allow air flow therethrough, and
at least one foot on the elongated shaft distal to the head of the tap portion,
wherein the at least one foot is configured to engage a part of the base of the base portion;
wherein, when the tap portion is unthreaded from the base portion, the at least one recess on the elongated shaft of the tap portion is exposed allowing air to pass through the at least one recess and into the container; and
wherein, when the tap portion is wound out, the thread on the elongated shaft terminates and the at least one foot of the tap portion and engages a part of the base of the base portion and acts to retain the tap portion to the base portion preventing further opening of the tap portion relative to the base portion.

15. The container as claimed in claim 14 wherein the breather valve is located on the container above a fluid level in the container when the container is used to feed a calf.

16. The container as claimed in claim 14 wherein the base portion of the breather valve fits into and retains the breather valve to the container.

17. A nursing bottle configured for feeding a calf, the nursing bottle comprising:

a teat configured for a calf to suck on to obtain fluid from the nursing bottle; and a breather valve, wherein the breather valve comprises
a base portion; and
a tap portion;
wherein the base portion comprises
a head,
a base, and
a shaft section with an exterior shape configured to fit with interference into a hole in the nursing bottle to which it is fitted, and
wherein the shaft section and head have an axial threaded cavity therein;
wherein the tap portion comprises
a head,
an elongated shaft extending from the head of the tap portion, a thread on the elongated shaft that cooperates with the axial threaded cavity on the base portion,
a non-threaded portion of the elongated shaft,
at least one recess on the elongated shaft configured to allow air flow therethrough, and
at least one foot on the elongated shaft distal to the head of the tap portion,
wherein the at least one foot is configured to engage a part of the base of the base portion;
wherein, when the tap portion is unthreaded from the base portion, the at least one recess on the elongated shaft of the tap portion is exposed allowing air to pass through the at least one recess and into the nursing bottle; and
wherein, when the tap portion is wound out, the thread on the elongated shaft terminates and the at least one foot of the tap portion engages a part of the base of the base portion and acts to retain the tap portion to the base portion preventing further opening of the tap portion relative to the base portion.

18. The nursing bottle as claimed in claim 17 wherein the breather valve is located on the nursing bottle above a fluid level in the nursing bottle when the nursing bottle is used to feed a calf.

19. The nursing bottle as claimed in claim 17 wherein the base portion of the breather valve fits into and retains the breather valve to the nursing bottle.

20. The nursing bottle as claimed in claim 17 wherein the nursing bottle is selected to feed calves; and wherein the nursing bottle is configured to allow the calf to drink from the teat and wherein the breather valve is configured to be adjusted to adjust a flow rate of fluid from the nursing bottle.

\* \* \* \* \*